WAVE GUIDE COUPLING STRUCTURE WITH TUNING MEANS

Filed Feb. 2, 1968

Inventor
ROBERT N. HARGIS.
BY
Mueller, Aichele & Rauner
ATTYS.

Inventor
ROBERT N. HARGIS
BY Mueller, Aichele & Rauner
Attys.

United States Patent Office
3,428,921
Patented Feb. 18, 1969

3,428,921
WAVE GUIDE COUPLING STRUCTURE WITH TUNING MEANS

Robert N. Hargis, Wheaton, Ill., assignor to Motorola, Inc., Franklin Park, Ill., a corporation of Illinois Continuation-in-part of application Ser. No. 524,948, Mar. 3, 1966. This application Feb. 2, 1968, Ser. No. 709,852
U.S. Cl. 333—33 11 Claims
Int. Cl. H03h 7/38

ABSTRACT OF THE DISCLOSURE

A resonant cavity is coupled to the output wave guide of a klystron oscillator to linearize the frequency response of the klystron. The impedance change versus frequency change is optimized by tuning the resonant cavity and changing the QK factor of the resonant cavity.

*Background of the invention*

This application is a continuation-in-part of application Ser. No. 524,948 of Robert N. Hargis, filed Feb. 3, 1966.

Klystron tubes are used for generating very high frequency waves in microwave communication equipment and in other applications. The frequency of the wave produced by the klystron can be modulated by applying a voltage to the repeller of the klystron. However, the klystron and coupling thereof to the wave guide introduces non-linearities so that the output frequency does not vary linearly with the repeller voltage. Various arrangements including attenuators, phase shifters, movable plungers and adjustable susceptance screws have been used in coupling sections to improve the linearity of the response. However, these have had various defects such as difficulty of adjustment, and variation of response with power output, and some corrective devices have caused a loss in power output. Also, prior structures have been complex and expensive and have had bulky and awkward configurations.

*Summary*

It is, therefore, an object of the present invention to provide a wave guide reactive network wherein the susceptance changes with frequency to linearize the change in frequency of a wave with respect to the modulating voltage.

Another object of the invention is to provide a wave guide structure for canceling second and third order non-linearities in the frequency vs. voltage characteristics of a klystron modulating system, while providing a matched condition for maximum power transmission.

A feature of the invention is the provision of a wave guide structure for coupling waves from a klystron or other wave generating device and which includes a compensating stub having a tuned cavity connected by a branch wave guide to the main wave guide to provide the desired rate of susceptance change with frequency change.

Another feature of the invention is the provision of a wave guide coupling structure for a klystron tube, having a matching stub to provide maximum output power, a phase shifter, and a compensating arm including a resonant branch stub connected to a tuned cavity for controlling the linearity of the frequency change produced by the klystron tube with the repeller voltage applied thereto. The compensating arm is not physically connected to the klystron tube, and does not require modification of the tube.

The invention is illustrated in the drawing wherein.

*Description of the invention*

In practicing the invention, a wave guide coupling structure is provided for modifying the frequency response of a wave generating device such as a klystron tube, so that the frequency of the wave produced varies linearly with the modulating voltage. The wave generating device is coupled to a wave guide and applies signals therethrough to an output port. A compensating arm is connected to the wave guide between the wave generating device and the output port and includes a branch wave guide coupled to the main wave guide and connecting a tunable cavity thereto. The tunable cavity has an input iris connecting the same to the branch wave guide and a capacitive tuning screw for adjusting the frequency thereof. The branch wave guide has a reflecting screw therein for reflecting a portion of the energy from the junction between the main wave guide and the branch wave guide. The reflective screw is spaced one-half wave length from the junction and the iris is spaced an odd-multiple of a quarter wave length from the junction. The end plate of the cavity is spaced less than one-half wave length and greater than one-quarter wave length from the input iris, so that the iris forms an open circuit when the cavity is tuned to the operating frequency, and this forms a short circuit at the junction so that there is no power loss. The tuning of the cavity provides a susceptance at the junction to compensate for the susceptance of the generating device and thereby remove non-linearities in the response. A phase shifter is included in the wave guide between the generating device and the junction to provide a balance for the susceptance change produced by the cavity, and thereby provide second order compensation. The adjustable reflecting screw in the branch wave guide controls the amount of correction as required depending upon the Q of the loaded cavity of the generating device. Accordingly, correction of a large number of factors is provided in a simple physical structure.

Figures 1, 4:
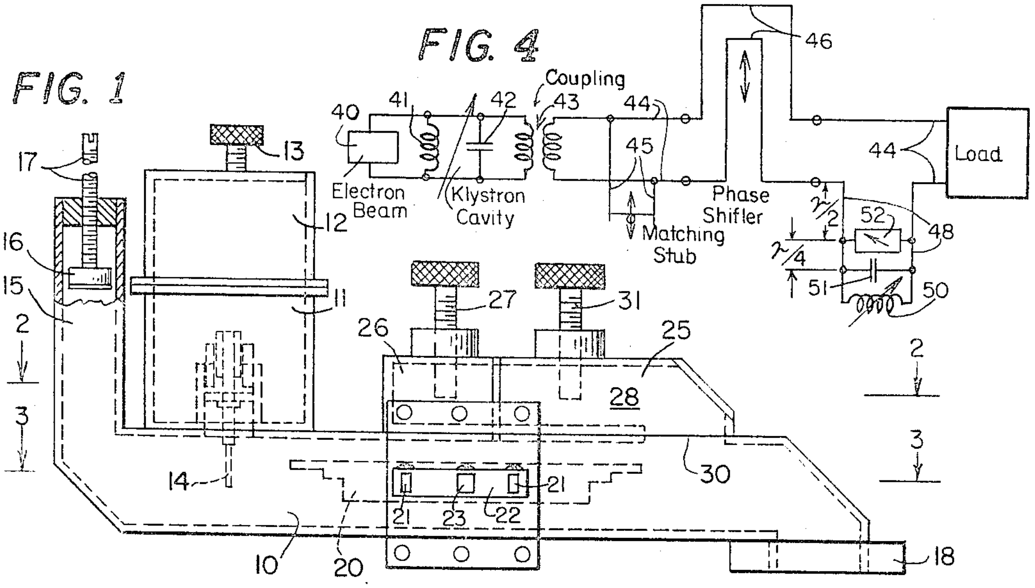
FIG. 1 is an elevation view of the wave guide coupling structure of the invention.
FIG. 4 is an equivalent circuit diagram.
Figure 2:
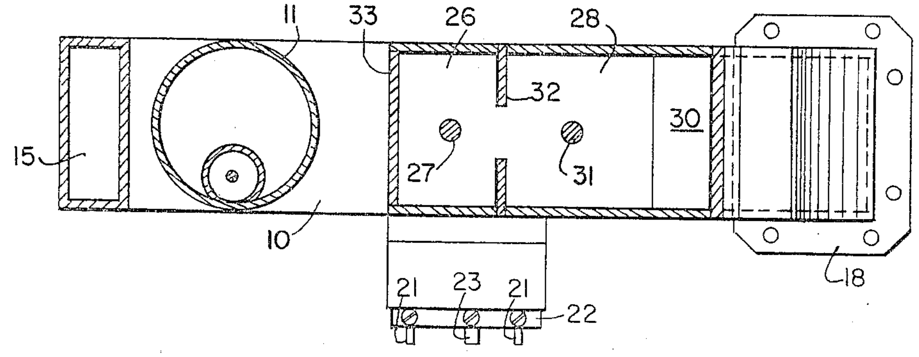
FIG. 2 is a cross-sectional view along the lines 2—2 of FIG. 1.
Figure 3:
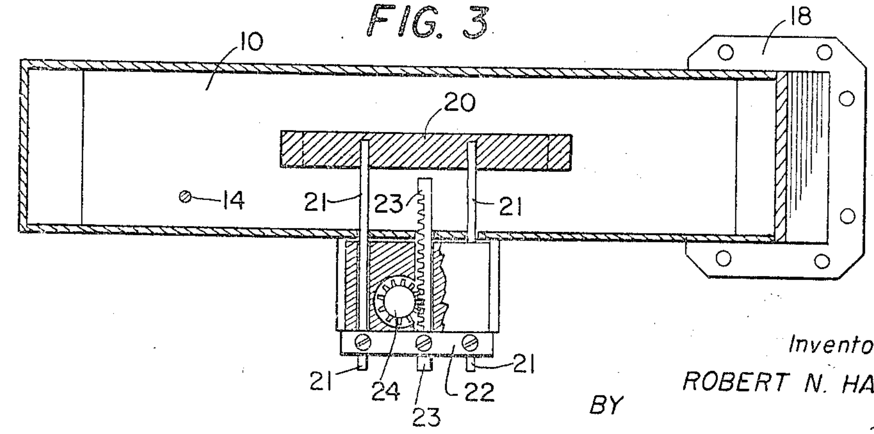
FIG. 3 is a cross-sectional view along the lines 3—3 of FIG. 1.

The wave guide coupling structure of the invention is illustrated in FIGS. 1, 2 and 3, wherein the main wave guide 10 has secured thereto a mounting cup and socket 11 for a klystron tube 12. The mounting cup and the klystron tube may be of known construction, with the klystron tube having an adjusting device 13 for tuning the klystron cavity. The klystron tube is of the reflex type having a repeller to which a voltage is applied for varying the frequency of the klystron tube, all as is well known. The klystron tube has a probe 14 which extends into the wave guide 10 to apply thereto waves within a given frequency range.

A stub 15 is coupled to the main wave guide 10, adjacent to the coupling of the klystron tube thereto, for matching the same so that maximum power is applied from the klystron tube to the wave guide 10. The stub 15 has positioned therein a plunger 16, the position of which is controlled by a threaded supporting screw 17.

A phase shifter 20 in the wave guide 10 is supported by an adjustable mounting to shift the phase of waves applied from the probe of the klystron tube to the output port 18. The phase shifter is supported by rods 21 connected to bridging element 22, to which rack 23 is also connected. A rotary pinion 24 can be turned to move the rack 23 to change the position of the phase shifter 20 within the wave guide 10. The action of the phase shifter is known.

The compensating arm or stub 25 is mounted along the wave guide and forms an E-plane or series junction therewith. This stub includes a cavity 26 having a capacitive tuning screw 27 extending therein, and a wave guide branch 28 coupling the cavity 26 to the main wave guide 10. Passage 30 which extends through the walls of the main wave guide 10 and the branch wave guide 28 provides a coupling junction therebetween. A reflecting screw 31 extends into the branch wave guide 28, an iris 32 (FIG. 2) forms the input to the cavity 26 and couples the cavity to the branch wave guide 28.

The reflecting screw 31 is spaced one-half of a wave length from the passage 30 which forms the junction between the main and branch wave guides. Therefore, this screw when positioned fully within the wave guide branch 28, in engagement with the opposite wall, effectively shorts out the compensating arm. In this example the cavity input iris 32 is positioned nearly one-half wave length from the shorting end plate 33 of the cavity 26, so that when the cavity is tuned to resonance by the screw 27, an open circuit is presented at the iris 32. The iris 32 is spaced an odd-multiple of a quarter wave length from the passage 30 which forms the junction between wave guide 10 and branch wave guide 28, so that the open circuit condition at the cavity input is transformed to a short circuit at the junction 30. Accordingly, the compensating arm has no effect on power transfer, and maximum power is applied from the klystron probe through the wave guide 10 to the output port 18.

As the frequency of the wave produced by the klystron tube varies with the voltage applied to the repeller, the increasing frequency produces a change of external susceptance at the klystron cavity in a negative direction, which tends to further raise the operating frequency of the klystron tube. The compensating arm forms an external network coupled to the klystron cavity and with the proper phasing and proper admittance change with frequency, this arm acts ot compensate for the non-linearity. The compensating arm introduces two factors, the resonance of the cavity 26, which can be controlled by the tuning screw 27, and the arm resonance determined by the length of the wave guide branch extending from the cavity input iris 32 to the junction 30 between the wave guides. There is no means provided in the branch wave guide 28 to change the effective length thereof with frequency. However, the phase shifter 20 in the main wave guide 10 can be used to compensate for this.

As the loaded Q of the klystron cavity varies with different tubes used, and at different frequencies, it is necessary to vary the Q of the compensating arm to obtain the proper correction. The reflecting screw 31 in the branch wave guid serves this purpose since a greater portion of the energy is reflected from the screw as it is moved further into the wave guide. Therefore, as the screw is inserted further into the wave guide, and a greater percentage of the resultant wave is reflected by the screw, the variation produced by reflection from the cavity forms a smaller variation in the resultant reflection, so that the amount of compensation is reduced. Since the screw 31 is located at a voltage minimum point, a relatively great amount of insertion is required for providing a significant effect, and the adjustment is not critical.

In the adjustment of the klystron tube and the correcting arm, the klystron adjustment is first made with the screw 31 inserted so that the cavity 26 has substantially no effect. The screw 31 is then withdrawn, and the cavity 26 is tuned for maximum transmitted power. The phase shifter 20 in the main wave guide must be checked for proper phasing. Then the cavity 26 is retuned, with the cavity and the phase shifter being adjusted mutually for minimum differential gain. The tuning of the cavity and the adjustment of the phase shifter render the susceptance curve symmetrical to provide second order correction.

With the reflecting screw 31 all the way out of the branch wave guide, over correction will normally take place. The reflecting screw is then gradually inserted in the branch wave guide, with the cavity tuning and phase shifted being readjusted until minimum differential gain is obtained. The adjustment of the position of the reflecting screw 31 compensates for the variation of the loaded Q of different klystron tubes, and for variations therein at different frequencies across the tuning range. This corresponds mainly to third order correction. This is accomplished without variation in the power output as no mismatch is introduced at the junction.

The physical structure of the E-plane compensating arm is such that it can be placed along the wave guide in a minimum of space, and it will not interfere with other components to which the wave guide is connected. The compensating arm can also be provided to form an H-plane junction in the event that this fits better in a particular application.

The equivalent electrical circuit of the structure of FIG. 1 is shown in FIG. 4. The electron beam of the klystron tube is represented by the block 40, and the klystron cavity is represented by the parallel resonant circuit including coil 41 and capacitor 42. This is adjustable by the klystron tuning device. The coupling from the klystron mounting cup into the main wave guide 10 is represented by the transformer 43. The main wave guide is represented by the line 44, and the matching stub with the adjustable plunger is represented by the stub 45. The phase shifter in the wave guide is represented by the jog in the line 44, which is designated 46. The amount of the jog will depend upon the position of the phase shifter. The compensating arm is represented by the stub 48, with the parallel circuit including coil 50 and capacitor 51 representing the cavity, and the variable reflecting device 52 representing the adjustable reflecting screw. The action of the compensating cavity, the phase shifter and the reflecting screw will be noted from a consideration of the schematic diagram of the equivalent circuit.

Figure 5:
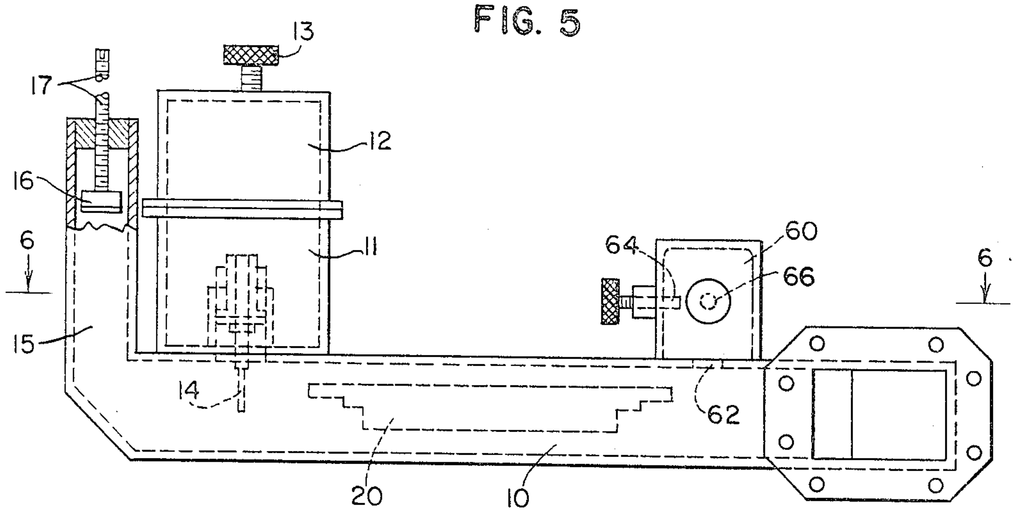
FIG. 5 is an elevation view of another embodiment of the invention.
Figure 6:
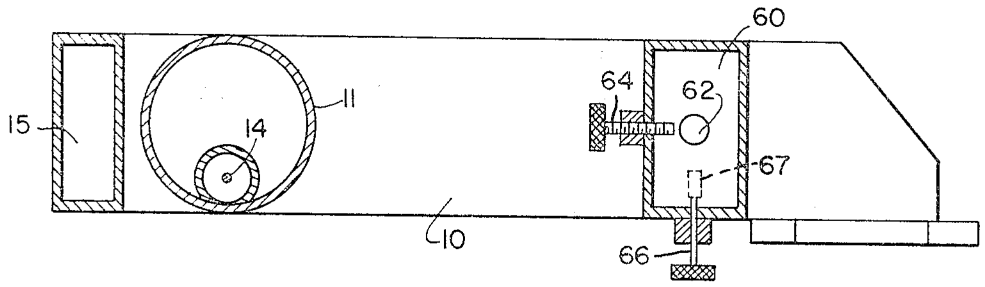
FIG. 6 is a cross-sectional view along lines 6—6 of FIG. 5.

Referring to FIGS. 5 and 6 another embodiment of the invention is illustrated and those portions of FIGS. 5 and 6 identical to FIGS. 1 and 2 have the same reference numerals. In the embodiment of FIGS. 5 and 6, resonant cavity 60 is coupled directly to the main wave guide structure through iris 62. Tuning of the resonant cavity is provided by tuning screw 64 which acts in the same manner as tuning screw 27 of FIG. 1. A loading screw 66 having a slug of lossy material 67 at the end thereof is inserted in the cavity. Loading screw 66 provides means for changing the Q of the cavity.

In order to provide a linear output for a modulated klystron, it is necessary that the impedance seen by the klystron vary as the frequency of the signal generated by the klystron varies. With the addition of the resonant cavity 26 of FIG. 1, or 60 of FIG. 5 a portion of the energy from the klystron is reflected back to the klystron and provides the impedance change versus frequency change required. The amount of impedance change versus frequency change is a function of the product of the Q of the cavity and the coefficient of the coupling K of the cavity. Changing this QK factor changes the rate at which the impedance seen by the klystron varies as the frequency of the signal from the klystron varies.

In order to provide optimum linearization with the circuit structure shown in FIGS. 1 and 2 the coefficient of coupling K is varied by changing the position of screw 31 to vary the QK factor. In the structure shown in FIGS. 5 and 6 the position of loading screw 66 is varied to change the Q of the cavity. The lossy slug at the end of loading screw 66 acts as a resistive component in the resonant circuit formed by the cavity. An increase in this resistive component decreases the Q of the cavity. Thus by positioning loading screw 66 the Q, and therefore the QK factor of the cavity, is changed. The position of loading screw 66 also affects the coupling between the cavity and the main wave guide structure to a lesser degree, thus further affecting the QK factor.

The structures which have been described have been found to be highly effective in linearizing the change in frequency of the wave with respect to the modulating voltage. The structures provide cancellation of both second and third order non-linearities, and higher order non-linearities have little effect. The structure of FIG. 1 also provides control of the degree of correction, and makes it possible to short out the compensating arm original alignment of the klystron tube. The adjustments for optimum linearity can then be easily made. These adjustments do not affect the power transmission, and the coupling wave guide structure provides maximum power transmission under all conditions.

What is claimed is:

1. A wave guide structure for use with a wave generating device for modifying the frequency response of the device, including in combination, an elongated main wave guide having an input port for connection to the generating device and an output port, phase shifter means in said wave guide between said input and output ports, a resonant cavity having an input and variable tuning means, a wave guide section coupling said cavity input to said main wave guide, said main wave guide and said wave guide section having mating openings forming a junction for coupling signals therebetween, and reflecting means in said wave guide section intermediate said junction and said cavity input.

2. A wave guide structure in accordance with claim 1 wherein said junction between said main wave guide and said wave guide section is an E-plane junction.

3. A wave guide structure in accordance with claim 1 for use with a klystron tube having a probe extending into said input port, and wherein said phase shifter means includes adjusting means for controlling the position thereof within said main wave guide.

4. A wave guide structure in accordance with claim 3, and including a matching stub connected to said main wave guide adjacent said input port, with an adjustable plunger in said matching stub to provide maximum power transfer from said klystron tube to said wave guide.

5. A wave guide structure in accordance with claim 1 for use with a wave generating device operating in a frequency range including a predetermined frequency, wherein said resonant cavity has an input iris spaced from said junction by an odd-multiple of a quarter wave length at the predetermined frequency, and said reflecting means is spaced from said junction by one-half wave length at the predetermined frequency.

6. A wave guide structure in accordance with claim 5 wherein said resonant cavity has an end plate spaced from said input iris by less than one-half wave length and greater than one-quarter wavelength at the predetermined frequency, and a capacitive adjusting screw positioned intermediate said end plate and said iris, so that said iris presents an open circuit when said cavity is tuned to said predetermined frequency, and a short circuit is presented thereby at said junction.

7. A wave guide structure in accordance with claim 5, wherein said resonant cavity provides a change in susceptance at said junction to compensate the wave thereat, and said reflecting means is an adjustable screw the position of which controls the relative reflections from said screw and said cavity to thereby control the compensation provided by said cavity.

8. A wave guide structure in accordance with claim 5 for use with a klystron tube having a probe extending into said input port for applying waves thereto which are modulated by a voltage applied to the klystron tube, said resonant cavity has a capacitive tuning screw for tuning the same to compensate for non-linearity of the frequency change of the wave produced by said klystron tube with changes in the modulating voltage.

9. A wave guide structure for use with a wave generating device for modifying the frequency response of the device, including in combination, an elongated main wave guide having an input port for connection to the generating device and an output port, phase shifter means in said wave guide between said input and output ports, a resonant cavity having variable tuning means and coupled to said main wave guide, and means coupled to said resonant cavity for varying the QK factor thereof.

10. The wave guide structure of claim 9 wherein, said main wave guide and said resonant cavity have mating openings forming an aperture for coupling energy therebetween.

11. The wave guide structure of claim 10 wherein, said resonant cavity includes an adjustable tuning screw and an adjustable loading screw each positioned in said resonant cavity.

References Cited

UNITED STATES PATENTS

| | | | |
|---|---|---|---|
| 3,173,103 | 3/1965 | Bean et al. | 333—83 |
| 3,215,955 | 11/1965 | Thomas et al. | 333—83 |

ELI LIEBERMAN, *Primary Examiner.*

L. ALLAHUT, *Assistant Examiner.*

U.S. Cl. X.R.

333—83; 334—40